Patented Dec. 19, 1950

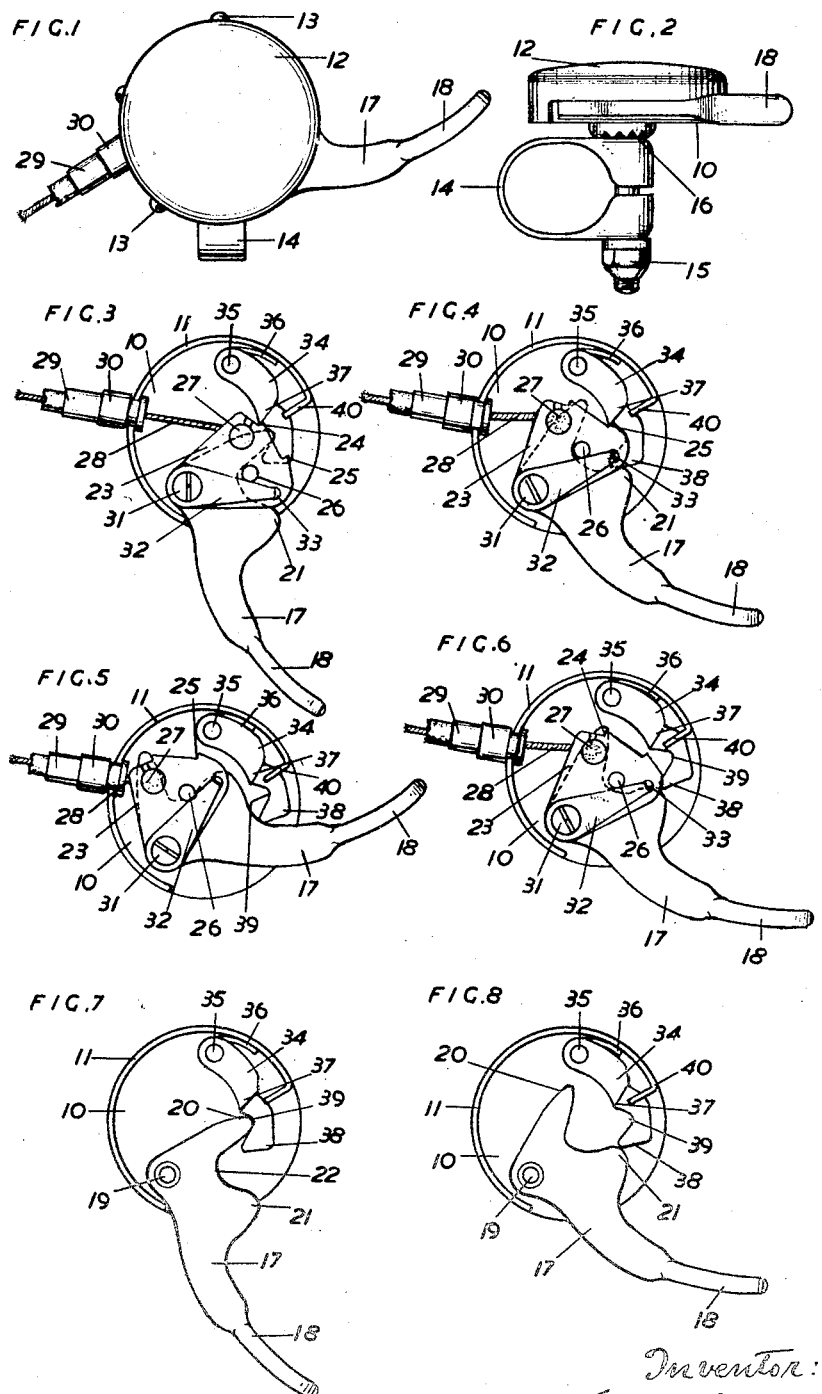

2,534,566

UNITED STATES PATENT OFFICE 2,534,566

CONTROL FOR VARIABLE-SPEED GEARS ON CYCLES

Thomas Alfred Yapp, Birmingham, England, assignor to The Hercules Cycle and Motor Company Limited, Birmingham, England, a company of Great Britain Application August 10, 1948, Serial No. 43,402
In Great Britain August 19, 1947

6 Claims. (Cl. 74—489)

This invention relates to a new or improved control for variable speed gears for cycles, and refers particularly to a control of the type adapted to be mounted on the handle-bars or on one of the frame members of the cycle and to be connected to the gear-selecting mechanism by a flexible cable which is under tension except when top gear is engaged.

According to my invention a control for a variable speed gear comprises a finger lever angularly movable about a fixed point and having angularly spaced projections or horns on one edge; a quadrant or ratchet plate to which the cable is connected and which is angularly movable about the same or an adjacent fixed point, a peg on the quadrant lying between the horns on the lever, and two or more teeth or steps on the periphery of the quadrant spaced at progressively different distances from its pivot and co-operating with a spring-pressed pivoted pawl which is adapted to be engaged by one of the horns on the finger lever when the latter is moved in one direction.

The relative disposition of the parts is such that when the finger lever is moved in a direction to tension the cable from the extreme or end position in which the cable is slack one horn on the finger lever engages the peg on the quadrant and takes the quadrant with it until the pawl engages the first tooth or step on the quadrant. A further movement of the lever in the same direction takes the quadrant with it again until the pawl engages the second tooth or step.

When the lever is moved in the opposite direction a horn on the lever engages a part of the pawl and rocks the pawl over clear of the second tooth or step on the quadrant, and the tension of the cable moves the quadrant back until the pawl engages the first tooth or step and arrests the quadrant. A further movement of the lever in the same direction rocks over the pawl again to clear the first tooth or step and allows the tension of the cable to return the quadrant to its initial position.

In a control for a three-speed gear the first and third positions of the quadrant will correspond to the engagement of top gear and bottom gear respectively and the intermediate position to the engagement of normal gear. The quadrant is positively located in each of the positions in which the cable is under tension, and in changing up from low gear the pawl endures that a stop must be made in normal gear.

For a four-speed gear the quadrant would have three teeth or steps spaced at progressively different distances from the pivot of the quadrant, the arrangement otherwise being the same.

One practical form of control for a three-speed gear in accordance with my invention is illustrated by way of example in the accompanying drawings in which:

Figure 1 is a plan of the control.

Figure 2 is a side elevation.

Figure 3 is a plan of the control with the cover removed and the moving parts in the position corresponding to the engagement of bottom gear.

Figure 4 is a similar plan showing the parts in the position corresponding to the engagement of normal or middle gear.

Figure 5 is a similar plan showing the parts in the position corresponding to the engagement of top gear.

Figure 6 is a similar plan showing the parts in the position they assume in changing from bottom to normal gear.

Figure 7 is a plan with the quadrant removed and the operating lever in bottom gear position.

Figure 8 is a similar plan with the operating lever and pawl in the position they assume when about to pass from normal gear to top gear.

In the construction illustrated the mechanism of the control is housed in a casing consisting of a circular sheet metal pressing or stamping 10 having a shallow peripheral flange 11 which is cut away over a portion of its periphery for the passage of the operating lever. The casing is closed by a flanged cover 12 fitting over and detachably secured to the flange 11 by screws 13. For attachment of the control to the handle-bar of a cycle a split clip 14 adapted to encircle the bar is fitted over a stud projecting from the base of the casing and is tightened by means of a nut 15 on the stud. Co-operating serrations 16 are provided on the base of the casing and on the adjacent part of the clip to allow the casing to be set at any desired angle relative to the clip.

An operating lever 17 having a projecting finger piece 18 is pivotally mounted on a stud 19 rigidly fixed to the casing. The lever has two angularly spaced horns 20, 21 separated by a notch or gap 22. Pivotally mounted on the same stud 19 above the lever is a quadrant 23 having in its arcuate edge two angularly spaced teeth or steps 24, 25; the tooth 24 being located at a shorter distance from the pivotal axis of the quadrant than the tooth 25. The quadrant carries a peg 26 projecting downwardly from its lower face into the notch or gap 22 in the lever.

The quadrant also has an opening to receive a cylindrical anchorage member 27 for one end of a flexible cable 28 leading to the gear selecting mechanism of the change speed gear to be controlled, the cable passing through a slot in the quadrant intersecting the opening for the anchorage member. The cable is taken through the usual flexible casing or conduit 29 for which an abutment is formed by a nipple 30 received in a notch in the flange 11 of the casing.

The quadrant and lever are retained on the stud 19 by a screw 31 screwed into a tapped hole in the end of the stud, one end of a blade spring 32 being held under the screw and the other end having a tongue engaging in a recess 33 in the quadrant to provide a certain amount of frictional resistance to the movement of the quadrant.

A pawl 34 is pivotally mounted on another stud 35 fixed in the casing and is urged by a spring 36 in a direction to cause the tooth 37 of the pawl to engage normally with one or other of the teeth 24, 25 on the quadrant. An extension of the pawl terminates in a nose 38 directed towards the lever and separated from the tooth 37 by a gap 39. The pawl is retained on the stud 35 by an inwardly cranked tongue 40 on the flange 11 of the casing which overlies the extension of the pawl when the parts are in their normal position, the extension being of less depth than the remainder of the pawl.

The gear selecting mechanism to which the cable 28 is connected is spring-loaded and maintains the cable under tension when bottom or normal gear is engaged so that the cable then exerts a pull on the quadrant 23 tending to rock the quadrant in an anti-clockwise direction.

Figure 3 shows the parts in the position they assume when bottom gear is engaged, the tooth 37 of the pawl then engaging the tooth 24 on the quadrant and the horn 20 on the lever lying in the gap 39 in the pawl extension as shown in Figure 7.

To engage normal gear the lever 17 is moved in an anti-clockwise direction which causes the horn 20 on the lever to engage the tooth 37 of the pawl below the quadrant and move the pawl outwardly against its spring. The pawl is thus moved clear of the tooth 24 on the quadrant and the tension of the cable rocks the quadrant in an anti-clockwise direction until the pawl engages with the tooth 25 on the quadrant. The parts are then in the position shown in Figure 4.

To engage top gear the lever 17 is again moved in an anti-clockwise direction which causes the horn 21 on the lever to engage the nose 38 on the pawl and move the pawl outwardly clear of the tooth 25 on the quadrant as shown in Figures 6 and 8 so that the quadrant moves in an anti-clockwise direction into the position shown in Figure 5.

To return to normal gear the lever is moved in a clockwise direction from the position shown in Figure 5 and the engagement of the peg 25 on the quadrant by the horn 20 on the lever causes the quadrant to move angularly with the lever until the pawl rides over and engages with tooth 25 on the quadrant.

Further movement of the lever in the same direction takes the quadrant with it until the pawl rides over and engages the tooth 24 on the quadrant and the mechanism is again in the low gear position shown in Figure 5.

It will be appreciated that the angular extent of the gap 22 in the lever is sufficient to allow for the necessary free movement of the lever relative to the quadrant to move the pawl clear of the teeth on the quadrant when passing from bottom gear to normal gear and from normal gear to top gear.

I claim:

1. A control for controlling a variable speed gear for a cycle through a flexible cable which is spring-loaded against movement in one direction, comprising an angularly movable finger lever, an angularly movable quadrant to which said cable is connected, angularly spaced teeth on the periphery of said quadrant, means coupling the quadrant to the lever for movement therewith in a direction to tension the cable, a spring-pressed pawl for engagement with the teeth on the quadrant to retain the said quadrant in successive angularly spaced positions, and means on said lever for moving said pawl out of engagement with an engaged tooth and to release it to engage the subsequent tooth on movement of the lever in a direction to release said cable, whereby the cable will return the quadrant through steps controlled by the teeth on the quadrant.

2. A control for controlling a variable speed gear for a cycle through a cable which is spring-loaded against movement in one direction, comprising a finger lever mounted for angular movement about a fixed axis, angularly spaced horns on one edge of said lever, a quadrant to which said cable is connected and which is angularly movable about said axis, a peg on said quadrant lying between said horns on the lever, a plurality of steps on the periphery of the quadrant spaced at progressively different distances from said axis, a spring-pressed pawl for successive engagement with said steps on the quadrant on movement of the quadrant with the lever in a direction to tension the cable, and means on said pawl for engagement by said horns on the lever to move said pawl out of the path of said steps on the quadrant on movement of the lever in the opposite direction.

3. A control for controlling a variable speed gear for a cycle having at least three gears engaged by movement of a flexible cable which is spring-loaded against movement in one direction, comprising a finger lever mounted for angular movement about a fixed axis, a number of angularly spaced horns on one edge of said lever one less than the number of gears, a quadrant to which said cable is connected and which is angularly movable about the said axis, a peg on said quadrant lying between said horns on the lever, a number of steps on the periphery of the quadrant spaced at progressively different distances from said axis, the number of said steps being one less than the number of gears, a spring-pressed pawl pivoted about another fixed axis for successive engagement with said steps on the quadrant on movement of the quadrant with the lever in a direction to tension the cable, the pawl arresting the quadrant and cable in positions corresponding to the engagement of different gears, and means on said pawl for engagement by said horns on the lever to rock said pawl out of the path of said steps on the quadrant on movement of the lever in the opposite direction and so to permit the cable to return the quadrant through successive steps.

4. A control for controlling a variable speed gear for a cycle through a flexible cable which is spring-loaded against movement in one direction, comprising a casing, adjustable means for mounting said casing on a part of a cycle, a peg rigidly mounted in said casing, a stepped quadrant to which said cable is connected and mounted on said peg for angular movement within said casing, a spring-pressed pawl pivotally mounted in said casing and co-operating with said quadrant to retain it in a plurality of spaced angular positions against the tension of the cable, and a finger-lever mounted on said peg in superimposed relationship with the quadrant for angular movement about said peg independent of the quadrant, said finger lever having a finger piece projecting from said casing and having means to entrain the quadrant for movement with the lever in a direction tensioning the cable and means to engage said pawl and rock it out of the path of the quadrant on movement of the lever in the opposite direction.

5. A control for controlling a variable speed gear for a cycle through a flexible cable which is spring loaded against movement in one direction comprising a quadrant adapted to be connected to said cable and being angularly movable about a fixed axis, said quadrant having an end position and being provided on its periphery with a plurality of steps defining other predetermined positions of said quadrant and being spaced at progressively different distances from said axis, a spring-pressed pawl for successive engagement with said steps, and a finger lever mounted for angular movement about said axis, said lever including first means to couple said quadrant to said lever for movement therewith in a direction to tension said cable, and second means to lift said pawl from step to step of said quadrant when said lever is turned in the opposite direction.

6. A device as claimed in claim 5 further comprising a yielding means in connection with said quadrant to cause frictional resistance to the movement of the latter.

THOMAS ALFRED YAPP.

REFERENCES CITED

The following references are of record in the file of this patent:

UNITED STATES PATENTS

| Number | Name | Date |
|---|---|---|
| 1,827,746 | Hansen | Oct. 20, 1931 |

FOREIGN PATENTS

| Number | Country | Date |
|---|---|---|
| 300,199 | Italy | Sept. 1, 1932 |
| 71,647 | Norway | Feb. 3, 1947 |